US012297696B2

(12) United States Patent
Fernando et al.

(10) Patent No.: US 12,297,696 B2
(45) Date of Patent: May 13, 2025

(54) OPERATOR GOVERNOR RELEASE FOR FIRE SHUTTERS

(71) Applicant: CornellCookson, LLC, Mountain Top, PA (US)

(72) Inventors: Brian Rishi Kachchakaduge Fernando, Avondale, AZ (US); John Elias Bullen, Phoenix, AZ (US); David Dawdy, Jim Thorpe, PA (US)

(73) Assignee: CornellCookson, LLC, Mountain Top, PA (US)

( * ) Notice: Subject to any disclaimer, the term of this patent is extended or adjusted under 35 U.S.C. 154(b) by 0 days.

(21) Appl. No.: 17/555,899

(22) Filed: Dec. 20, 2021

(65) Prior Publication Data

US 2023/0193689 A1 Jun. 22, 2023

(51) Int. Cl.

| | |
|---|---|
| ***E06B 9/70*** | (2006.01) |
| ***E05D 13/00*** | (2006.01) |
| ***E06B 5/16*** | (2006.01) |
| ***E06B 9/17*** | (2006.01) |

(52) U.S. Cl.

CPC .............. *E06B 9/70* (2013.01); *E05D 13/003* (2013.01); *E05D 13/1261* (2013.01); *E06B 5/16* (2013.01); *E06B 9/17* (2013.01); *E05Y 2900/106* (2013.01)

(58) Field of Classification Search

CPC ..... E06B 9/17; E06B 9/11; E06B 9/76; E06B 2009/807; E06B 9/82; E06B 9/84; E06B 9/88; E06B 9/90; E06B 9/74

See application file for complete search history.

(56) References Cited

U.S. PATENT DOCUMENTS

| | | | | | |
|---|---|---|---|---|---|
| 1,332,942 | A * | 3/1920 | Brunst | E06B 9/82 | 160/8 |
| 1,375,219 | A * | 4/1921 | Johnson | E06B 9/60 | 160/7 |
| 1,602,366 | A * | 10/1926 | McCloud | A62C 2/10 | 160/8 |
| 1,795,390 | A * | 3/1931 | Graystone | E06B 9/82 | 160/301 |
| 2,019,085 | A * | 10/1935 | Miller | E06B 9/82 | 160/8 |
| 2,390,117 | A * | 12/1945 | Michelman | E06B 9/74 | 160/310 |
| 2,528,869 | A * | 11/1950 | Paul | E06B 9/68 | 160/8 |

(Continued)

OTHER PUBLICATIONS

International Search Report and Written Opinion mailed in corresponding PCT Application No. PCT/US2022/045834 dated Jan. 13, 2023, 9 pages.

*Primary Examiner* — Daniel P Cahn
*Assistant Examiner* — John W Hanes, Jr.

(57) ABSTRACT

In example implementations, an adjustable speed operator governor release for a rolling fire shutter is provided. The adjustable speed operator governor release includes a shaft coupled to the rolling fire shutter, a gear on a first end of the shaft to engage a spring-loaded clutch during a fire, wherein the spring-loaded clutch is moved to disengage from a drive assembly and to engage the gear of the adjustable speed governor to operate the rolling fire shutter, and a linear speed adjusting mechanism coupled to the shaft and the gear to control a speed of free fall of the rolling fire shutter during the fire.

20 Claims, 7 Drawing Sheets

(56) References Cited

U.S. PATENT DOCUMENTS

| | | | | |
|---|---|---|---|---|
| 2,670,065 | A * | 2/1954 | Stevens, Jr. | E06B 9/70 49/140 |
| 2,758,526 | A * | 8/1956 | McFadden | G03B 9/64 396/456 |
| 2,946,377 | A * | 7/1960 | Zoll | E06B 9/82 74/1.5 |
| 3,965,960 | A * | 6/1976 | Massey | E06B 9/82 4/558 |
| 4,333,270 | A * | 6/1982 | Catlett | E05F 15/614 49/336 |
| 4,651,940 | A * | 3/1987 | Nakamura | E06B 9/88 160/310 |
| 4,697,676 | A * | 10/1987 | Haake | E06B 9/84 192/148 |
| 4,941,320 | A * | 7/1990 | Kersten | E05F 15/59 49/27 |
| 5,170,830 | A * | 12/1992 | Coslett | B60J 1/2091 242/379.2 |
| 5,253,693 | A * | 10/1993 | Marlatt | E06B 9/84 160/315 |
| 5,263,527 | A * | 11/1993 | Marlatt | E06B 9/74 160/310 |
| 5,421,221 | A * | 6/1995 | Warchocki | E06B 9/84 160/310 |
| 5,447,477 | A * | 9/1995 | Bresson | E06B 9/74 160/310 |
| 5,488,983 | A * | 2/1996 | Jung | E06B 9/90 160/319 |
| 5,551,535 | A * | 9/1996 | Krolo | E05D 13/003 277/412 |
| 5,566,741 | A * | 10/1996 | Ogawara | E06B 9/90 160/297 |
| 5,605,185 | A * | 2/1997 | McKeon | A62C 2/10 160/133 |
| 5,673,514 | A * | 10/1997 | McKeon | A62C 2/24 49/30 |
| 5,743,320 | A * | 4/1998 | McKeon | E06B 9/82 49/27 |
| 5,881,849 | A * | 3/1999 | Gassmann | F16D 35/005 192/58.41 |
| 5,893,234 | A * | 4/1999 | McKeon | E06B 9/68 49/7 |
| 6,055,885 | A * | 5/2000 | Shea | E06B 9/74 49/140 |
| 6,059,008 | A * | 5/2000 | Yoshida | E05F 5/00 160/8 |
| 6,381,903 | B1 * | 5/2002 | Desrochers | E06B 9/74 160/310 |
| 6,900,602 | B1 * | 5/2005 | Hsieh | E06B 9/82 160/368.1 |
| 6,959,751 | B2 | 11/2005 | Savard et al. | |
| 7,086,441 | B2 * | 8/2006 | Barriault | F16F 9/19 160/8 |
| 7,293,805 | B1 * | 11/2007 | Hsieh | E06B 9/82 292/201 |
| 7,699,144 | B2 * | 4/2010 | Hsieh | E05F 1/006 160/9 |
| 7,706,067 | B2 * | 4/2010 | Liang | G03B 21/58 359/461 |
| 7,878,230 | B2 * | 2/2011 | Daus | E06B 9/68 160/1 |
| 8,567,573 | B2 * | 10/2013 | Hsieh | E06B 5/16 160/9 |
| 8,662,140 | B2 * | 3/2014 | Hsieh | E05F 11/54 160/310 |
| 8,905,113 | B2 | 12/2014 | Daus et al. | |
| 8,985,521 | B2 * | 3/2015 | Dubost | B64C 13/044 475/331 |
| 9,217,284 | B2 | 12/2015 | Panseri et al. | |
| 9,376,864 | B2 * | 6/2016 | Hsieh | E06B 9/08 |
| 9,689,203 | B1 * | 6/2017 | Freberg | E06B 9/68 |
| 10,202,803 | B2 * | 2/2019 | Hsieh | F16D 65/22 |
| 11,505,985 | B2 * | 11/2022 | Hsieh | E05F 15/72 |
| 2003/0000796 | A1 * | 1/2003 | Kawai | F16D 41/067 192/45.01 |
| 2003/0221801 | A1 * | 12/2003 | Beaudoin | E05D 13/1261 160/191 |
| 2004/0154759 | A1 * | 8/2004 | Minder | E06B 9/44 160/298 |
| 2005/0082870 | A1 * | 4/2005 | Chikata | E05F 15/63 296/146.2 |
| 2007/0143964 | A1 * | 6/2007 | Mittermeyer | E06B 9/84 16/344 |
| 2010/0005723 | A1 * | 1/2010 | Evans | E05F 15/668 49/322 |
| 2010/0132505 | A1 * | 6/2010 | Hsieh | E06B 9/74 160/310 |
| 2012/0024484 | A1 * | 2/2012 | Hsieh | E06B 9/74 160/291 |
| 2012/0240470 | A1 * | 9/2012 | Leivenzon | E06B 9/74 49/140 |
| 2013/0025803 | A1 * | 1/2013 | Eiterman | G01M 99/008 73/865.9 |
| 2013/0025804 | A1 * | 1/2013 | Hsieh | E06B 9/84 160/305 |
| 2013/0074409 | A1 * | 3/2013 | Hsieh | E06B 9/80 49/139 |
| 2013/0140130 | A1 * | 6/2013 | Dang | E06B 9/74 192/93 A |
| 2013/0220561 | A1 * | 8/2013 | Yu | E06B 9/78 160/405 |
| 2014/0060754 | A1 * | 3/2014 | Hsieh | A62C 3/14 160/7 |
| 2014/0131502 | A1 * | 5/2014 | Zhu | E06B 9/42 242/385.4 |
| 2014/0332172 | A1 * | 11/2014 | Hsieh | E06B 9/08 160/133 |
| 2014/0342864 | A1 * | 11/2014 | Hsieh | E06B 9/78 474/152 |
| 2014/0352898 | A1 * | 12/2014 | Veatch | E06B 9/62 29/525.01 |
| 2015/0059252 | A1 * | 3/2015 | Lueker | E05F 5/003 49/506 |
| 2015/0101147 | A1 * | 4/2015 | Hsieh | E05F 3/16 16/64 |
| 2016/0201389 | A1 * | 7/2016 | Oakley | E06B 9/74 160/368.1 |
| 2017/0051559 | A1 * | 2/2017 | Anthony | E06B 9/44 |
| 2017/0218703 | A1 * | 8/2017 | Wei | E06B 9/322 |
| 2019/0112874 | A1 * | 4/2019 | Hsieh | E06B 9/84 |
| 2019/0112875 | A1 * | 4/2019 | Hsieh | F16H 57/039 |
| 2019/0264502 | A1 * | 8/2019 | Marocco | E06B 9/74 |
| 2020/0399948 | A1 * | 12/2020 | Hsieh | E05F 15/72 |
| 2021/0095523 | A1 * | 4/2021 | Magro | E06B 9/78 |
| 2021/0131180 | A1 | 5/2021 | Jones | |
| 2021/0214999 | A1 * | 7/2021 | Magro | E06B 9/68 |
| 2022/0235608 | A1 * | 7/2022 | Lee | E06B 9/34 |
| 2023/0193689 | A1 * | 6/2023 | Fernando | E06B 9/17 160/315 |

* cited by examiner

OPERATOR GOVERNOR RELEASE FOR FIRE SHUTTERS

BACKGROUND

Many locations may have openings that may be closed by a rolling door or fire shutter. Some of the openings may include counters to interact with customers. The counters may be located at stadiums, office buildings, kiosks, cafeterias, shopping areas, boardwalks, and the like. Rolling shutters may be installed over these openings to seal the opening. The rolling shutters may be comprised of multiple panels that can be rolled up and down along a guide to open and close the shutter.

One type of rolling shutter is a fire shutter. In the event of a fire, fire shutters are used as a structural barrier to compartmentalize the building and prevent the spread of fire. A fire shutter may be designed to withstand the heat and pressure generated from a fire. The fire shutter may include a release mechanism that allows the fire shutter to automatically close during a fire.

DETAILED DESCRIPTION

Examples described herein provide an improved operator governor release for fire shutters that have a relatively lower weight, such as those used for counter openings or other smaller openings. As discussed above, a fire shutter may be designed to withstand the heat expansion and pressure generated from a fire. The fire shutter may include a release mechanism that allows the fire shutter to automatically close during a fire.

A governor may be used to control a closing speed of the fire shutter in response to a fire or alarm. Some designs use governors with no speed adjustability. Thus, the speed at which the fire shutter closes is fixed to the size of the reduction gears supplied or the governor that is used. The closing speed may be undesirable for or may fail to satisfy NFPA 80 standards (no slower than 6 inches per second and not faster than 24 inches per second), but to modify the speed would require a new component, and the adjustment cannot be made in the field.

In addition, a spring tension release system may be located on the opposite side of the fire shutter from the governor in previous designs. Thus, to reset the governor, an operator must also access the opposite side of the fire shutter header to reset the release the spring tension release mechanism.

The present disclosure provides an improved operator governor release for fire shutters. The improved operator governor release moves the release mechanism to the same side of the fire shutter as the governor. In addition, the governor may be designed to allow for the in-field adjustment of closing speeds for the fire shutter. Lastly, the overall design of the operator governor release of the present disclosure can reduce the overall size and/or footprint of the upper hood assembly by several inches.

Figure 1:
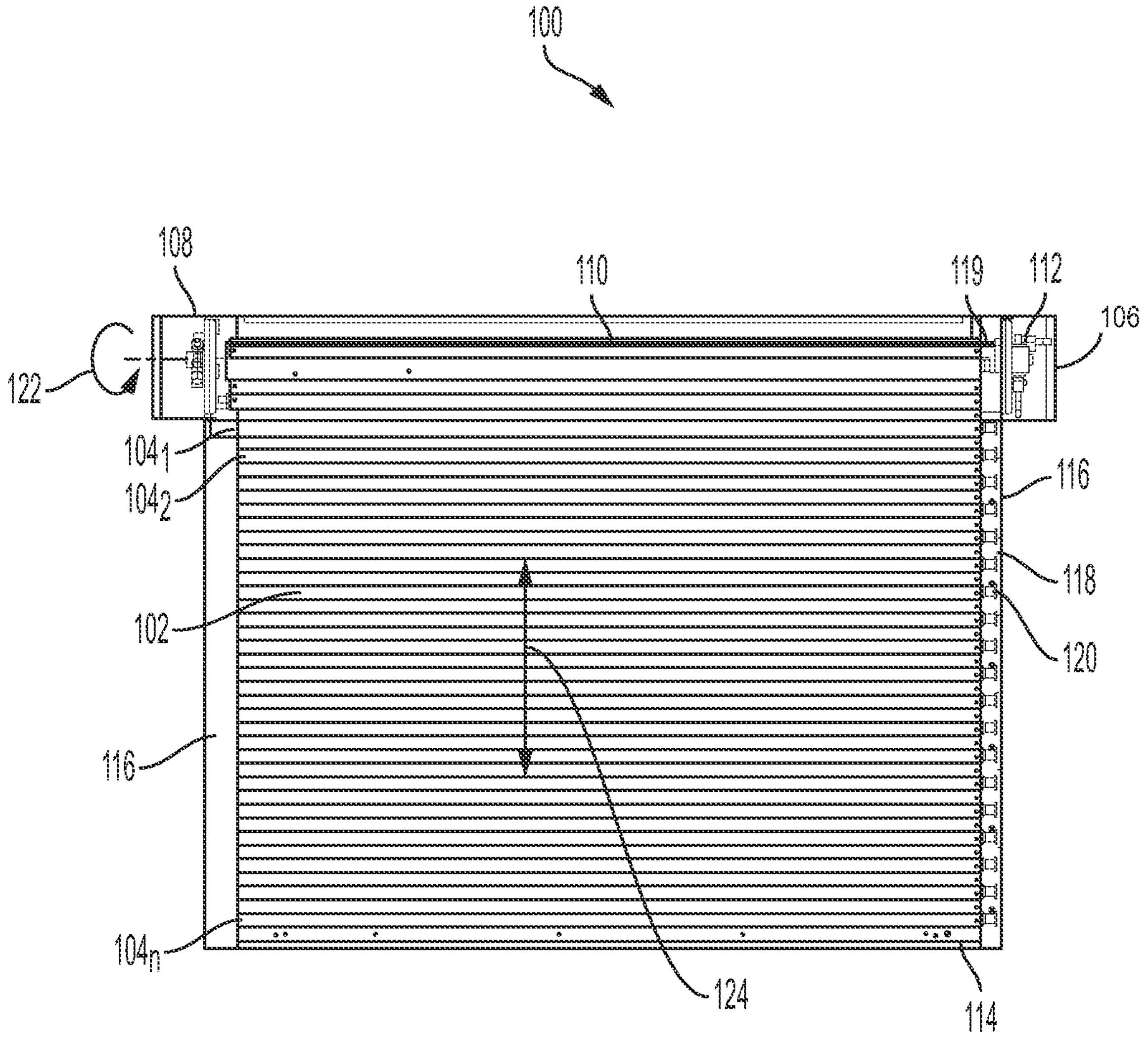
FIG. 1 illustrates a block diagram of a fire shutter of the present disclosure.

FIG. 1 illustrates an example fire shutter assembly 100 with an improved operator governor release 112 of the present disclosure. The fire shutter assembly may include a fire shutter 102 that is comprised of a plurality of slats $\mathbf{104}_1$ to $\mathbf{104}_n$ (hereinafter also referred to individually as a slat 104 or collectively as slats 104). The fire shutter 102 may move vertically up and down as shown by an arrow 124. The fire shutter 102 may include a bottom bar 114 that rests against a counter surface or floor surface when the fire shutter 102 is in a closed position, as shown in FIG. 1.

In an example, the slats 104 may include endlocks 120 that may be located within a guide assembly 118. The slats 104 may be secured by the endlocks 120 located within the guide assembly 118. The guide assembly 118 may also guide movement of the slats 104 to open and close the fire shutter.

In an example, the fire shutter assembly 100 may include jambs 116 on opposite sides of the fire shutter 102. The guide assembly 118 may be located within the jambs 116. Thus, the fire shutter assembly 100 may include two guide assemblies 118 of the present disclosure on opposite sides of the fire shutter 102 and within the respective jambs 116. In other words, a first guide assembly 118 may be located in the jamb 116 on a first side of the fire shutter 102 and a second guide assembly may be located in the jamb 116 on a second side of the fire shutter 102.

In addition, each slat 104 may include two endlocks 120 on opposite ends of the slat 104. Thus, each slat 104 may be secured in the guide assemblies 118 by the endlocks 120 on opposite ends of the slat 104.

In an example, the fire shutter assembly 100 may include a head assembly 106. The head assembly 106 may include a barrel 110 (also referred to as a counter balance shaft) that can rotate around its axis 360 degrees as shown by an arrow 122. The fire shutter 102 may be wrapped concentrically about the barrel 110 as the fire shutter 102 is opened.

The head assembly 106 may also include a governor assembly 119 with the improved operator governor release 112 of the present disclosure, and other components such as an intermediate sprocket, a main sprocket, an adjustor bracket, a fuselink chain assembly, and the like. The improved operator governor release 112 may control how the fire shutter 102 is closed in the event of a fire or an alarm and eliminate re-tensioning of the counterbalance spring. Details of the components of the operator governor release 112 and how the operator governor release 112 operate are discussed further below in connection with FIGS. 2-7.

In case of a fire, the fire shutter 102 may be closed to compartmentalize the fire to a particular location and to help prevent spread of the fire. The fire shutter 102 may come under high thermal loads and pressure (from products of combustion or from wind loads). The guide assembly 118 may be designed to provide enough holding force against the endlocks 120 of the slats 104. As a result, the fire shutter 102 may withstand thermal stresses and pressures generated by a fire and prevent the fire shutter 102 from being released from the guide assembly 118.

Figure 2:
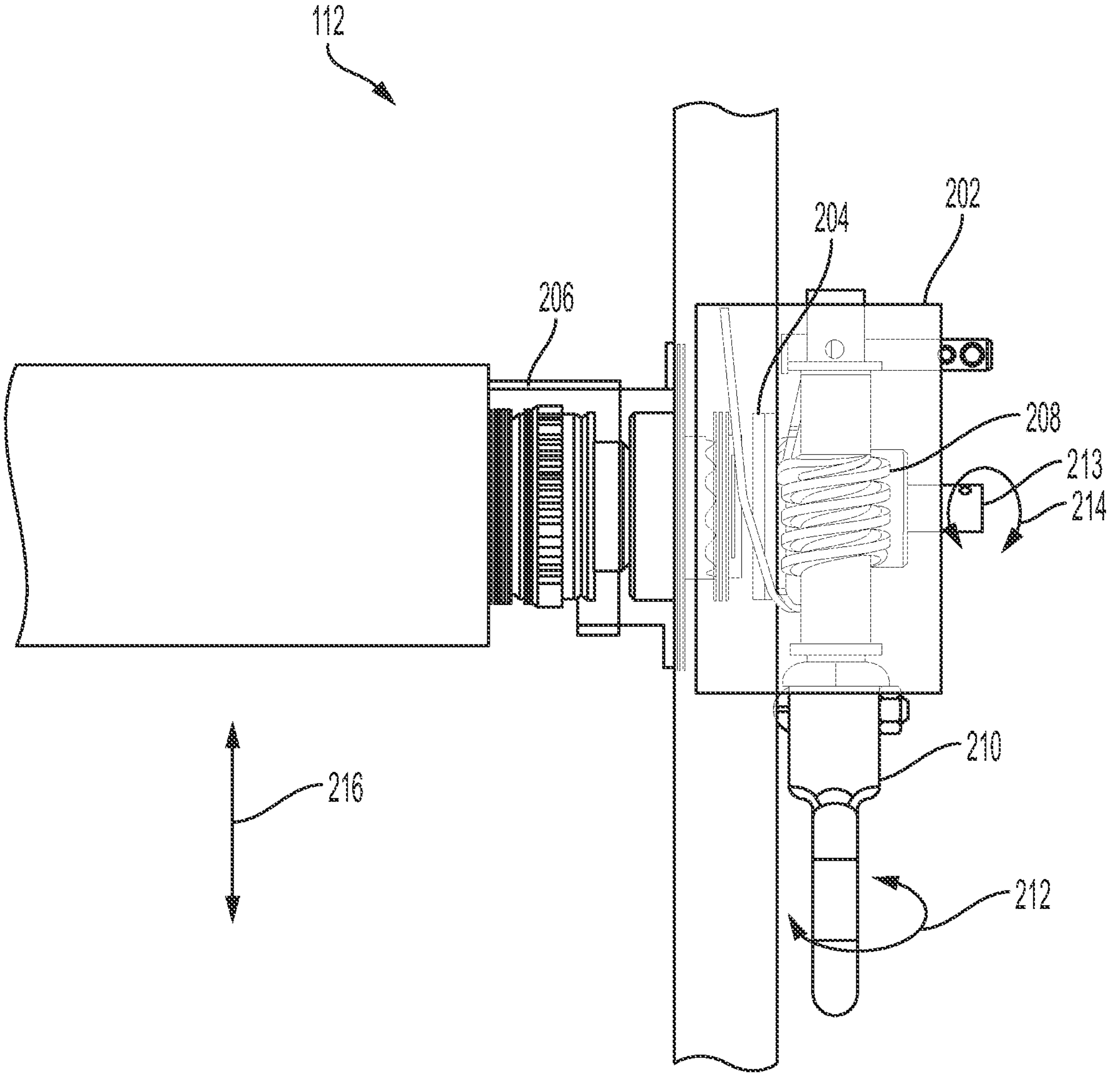
FIG. 2 is a cross-sectional view of an operator governor release of the present disclosure.
Figure 3:
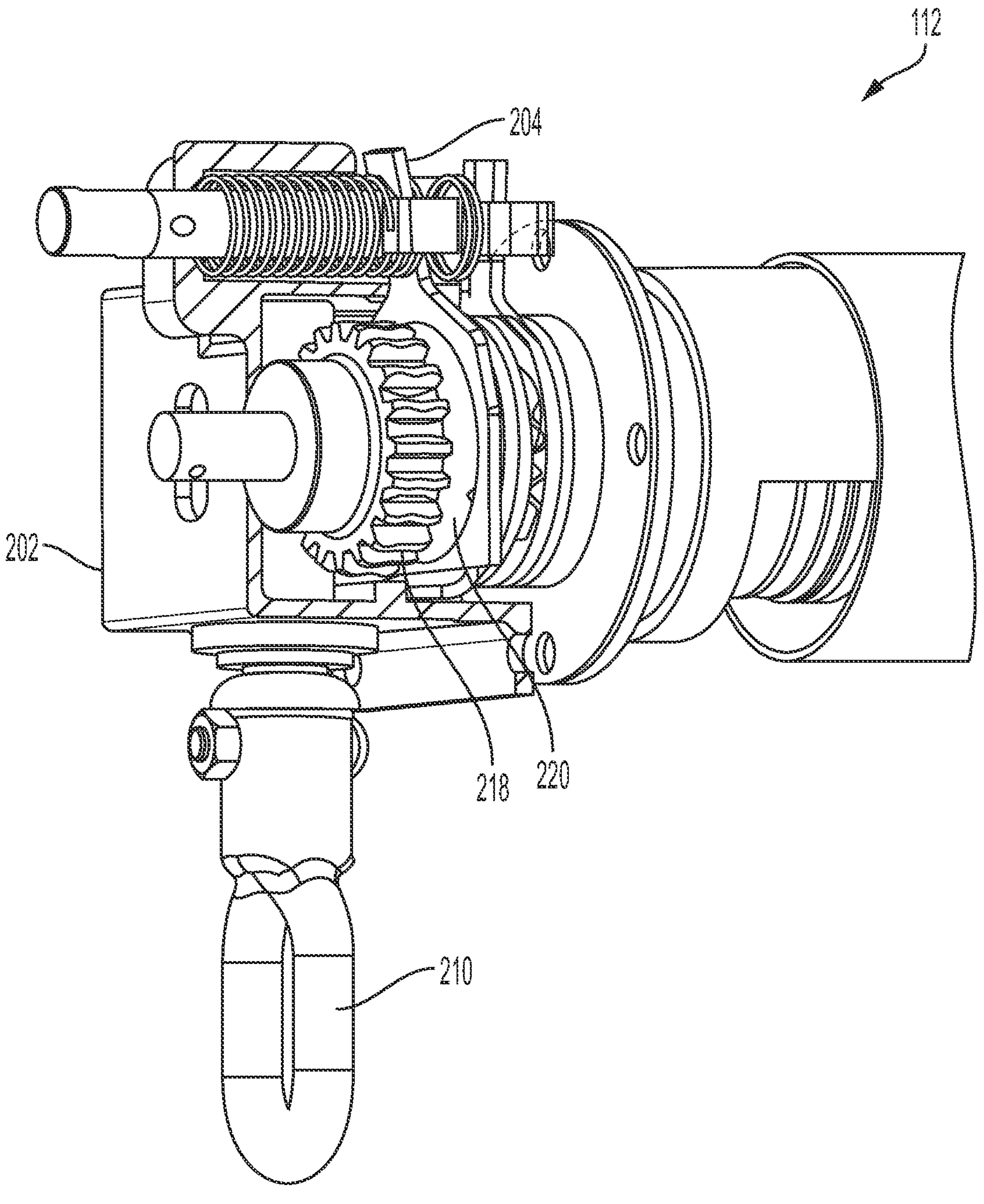
FIG. 3 is an isometric view of the drive assembly of the present disclosure.

FIG. 2 illustrates a cross-sectional view of components of the operator governor release 112. The components may include a drive assembly 202, a spring-loaded clutch 204, and an adjustable speed governor 206 that is part of the improved operator governor release 112. FIG. 3 illustrates an isometric view of the drive assembly 202 from an opposite side.

As shown, by FIGS. 2 and 3, the improved operator governor release 112 of the present disclosure is arranged on a same side of the head assembly 106 or fire shutter 102 as the drive assembly 202. As a result, tension release of the main door spring is eliminated. In addition, the drive assembly 202, the spring-loaded clutch 204, and the adjustable speed governor 206 are arranged in-line along a center shaft 213. As a result, the footprint or dimensions of the improved operator governor release 112 are reduced. In one embodiment, to further reduce the amount of side room that is consumed, a crank box may be moved to the front of the fire shutter 102 with a sprocket. For example, the width of the head assembly 106 can be reduced by as much as 5 to 10 inches.

In one embodiment, the drive assembly 202 may provide manual operation of the fire shutter 102 during "normal" operation. "Normal" operation may be defined as any condition where a fire is not present or an alarm is not triggered.

In one embodiment, the drive assembly 202 may include a crank handle 210 and a back drive feature 208 coupled to a center shaft 213. In one embodiment, the back drive feature 208 may be a worm set or worm gear that may also serve as a release mechanism because of the worm pressure angle that is selected and the inherent back drive feature of the worm gear. The pressure angle prevents the worm gear from back driving. However, it should be noted that other back drive feature assemblies may be deployed. The crank handle 210 may be rotated as shown by an arrow 212 to open and close the fire shutter 102 manually for normal operation of the fire shutter 102. For example, as the crank handle 210 is rotated, the back drive feature 208 may rotate against a corresponding gear 218 (illustrated in FIG. 3) on the center shaft 213.

In one embodiment, the drive assembly 202 may include a receiving gear 220 (illustrated in FIG. 3) to engage a clutch or clutch plate of the spring-loaded clutch 204, as discussed in further detail below and illustrated in FIG. 4. When the receiving gear 220 is engaged with the clutch of the spring-loaded clutch 204, the rotation of the center shaft 213 may also cause rotation of the barrel 110 to rotate the fire shutter 102 up and down, as shown by an arrow 216.

Figure 4:
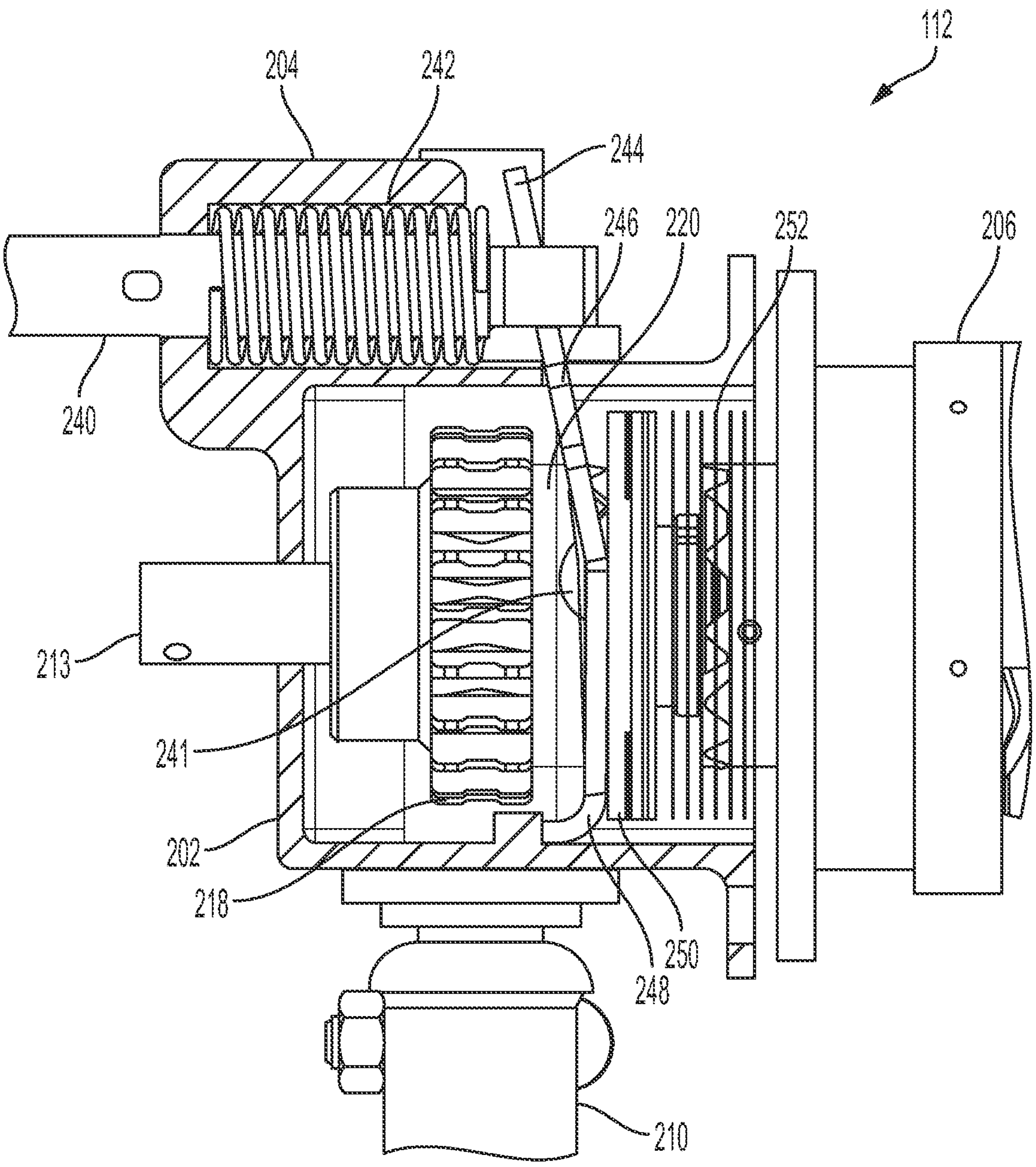
FIG. 4 is a cross-sectional view of the spring-loaded clutch in a normal state of operation of the present disclosure.

FIG. 4 illustrates a cross-sectional view of the improved operator governor assembly 112 of the present disclosure during a "normal" operation. FIG. 4 illustrates further details of the spring-loaded clutch 204 and how the spring-loaded clutch 204 operates.

Figure 5:
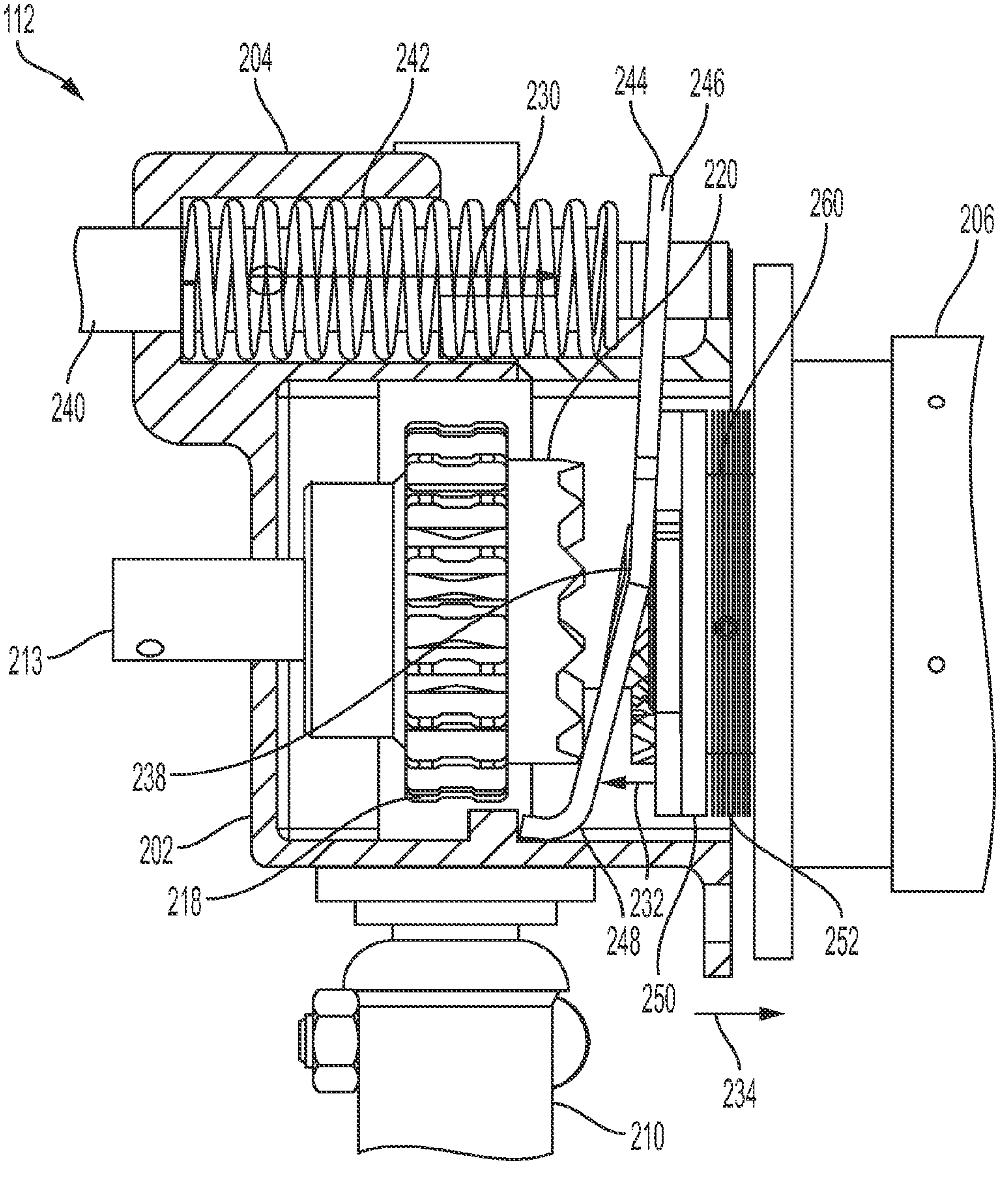
FIG. 5 is a cross-sectional view of the spring-loaded clutch of the present disclosure when a sash chain is released during a fire.

In one embodiment, the spring-loaded clutch 204 may include a clutch 250, a lever 244, a sash chain 240, an actuator spring 242, and a clutch spring 252. The clutch 250 may be located on the center shaft 213. The center shaft 213 may run through an opening in a center of the clutch 250 to allow the clutch 250 or clutch plate to move left and right along the center shaft 213. In other words, the clutch 250 may be slid towards a receiving gear 220 of the drive assembly 202 or towards a receiving gear 260 of the adjustable speed governor 206, as shown in FIG. 5.

In one embodiment, the position of the clutch 250 may be determined by the sash chain 240 and a state of the actuator spring 242. For example, the sash chain 240 may be coupled to an end of the lever 244. The lever 244 may include a first member 246 and a second member 248. The first member 246 may be coupled to the second member 248 at an angle 241 or formed from a single piece of material and bent to an angle 241. The angle 241 may be less than 180 degrees.

In one embodiment, the lever 244 may have a fork or prong shape. For example, the second member 248 may actually have two portions that are located on opposite sides of the center shaft 213. The two portions of the second member 248 may merge with a single first member 246 in a "fork" or "prong" shape.

During "normal" operation, the sash chain 240 may apply a tension or pull on the actuator spring 242 to keep the actuator spring 242 in a contracted state. In return, the actuator spring 242 may pull on an end of the first member 246 of the lever 244. Pulling the end of the first member 246 may move the second member 248 to provide enough clearance for the clutch 250 to move towards the receiving gear 220. The second member 248 may lay flat against a surface of the clutch 250 that faces the drive assembly 202.

The clutch spring 252 may expand and press against the clutch 250 from an opposite side where the lever 244 is located. The clutch spring 252 may press the clutch 250 against the receiving gear 220 to allow the clutch 250 to engage the receiving gear 220 of the drive assembly 202. The pull of the actuating spring 242 may pull the lever 244 to provide enough clearance to allow the force of the clutch spring 252 to press the clutch 250 towards the receiving gear 220. In the "normal" operation, the drive assembly 202 may be used to manually open and close the fire shutter 102.

At a later time, a fire or an alarm condition may occur. In the event of a fire, the heat from the fire may release the sash chain 240. For example, the heat from the fire may melt the sash chain 240. As a result, the tension applied to actuator spring 242 may be removed, as shown in FIG. 5. FIG. 5 illustrates an example of how the spring-loaded clutch 204 engages the adjustable speed governor 206 during a fire.

In one embodiment, when the sash chain 240 is released, the potential energy stored in the actuator spring 242 may be released. As a result, the actuator spring 242 may expand laterally (e.g., moving left and right along the page) in a direction shown by an arrow 230. The movement of the actuator spring 242 causes movement of the first member 246 of the lever 244. In other words, the force released by the actuator spring 242 may press against an end of the first member 246 of the lever 244. For example, the first member 246 may be moved closer to the adjustable speed governor 206.

As the first member 246 is moved towards the adjustable speed governor 206, the second member 248 may be moved closer to the drive assembly 202. A point 238 where the angle 241 is formed between the first member 246 and the second member 248 may press against the clutch 250. As a result, the clutch 250 may laterally move along the center shaft 213 towards the receiving gear 260 of the adjustable speed governor 206.

A spring load of the actuator spring 242 may be greater than a spring load of the clutch spring 252. As a result, the spring load of the actuator spring 242 may overcome the spring load of the clutch spring 252, allowing the clutch spring 252 to compress as the clutch 250 is moved against the clutch spring 252 towards the receiving gear 260.

When the fire event, alarm, or test is over, the sash chain 240 may be reset to re-apply the tension to the actuator spring 242. Thus, the first member 246 of the lever 244 may be repositioned towards the drive assembly 202 to reengage the clutch 250 with the receiving gear 220 of the drive assembly 202.

Figure 6:
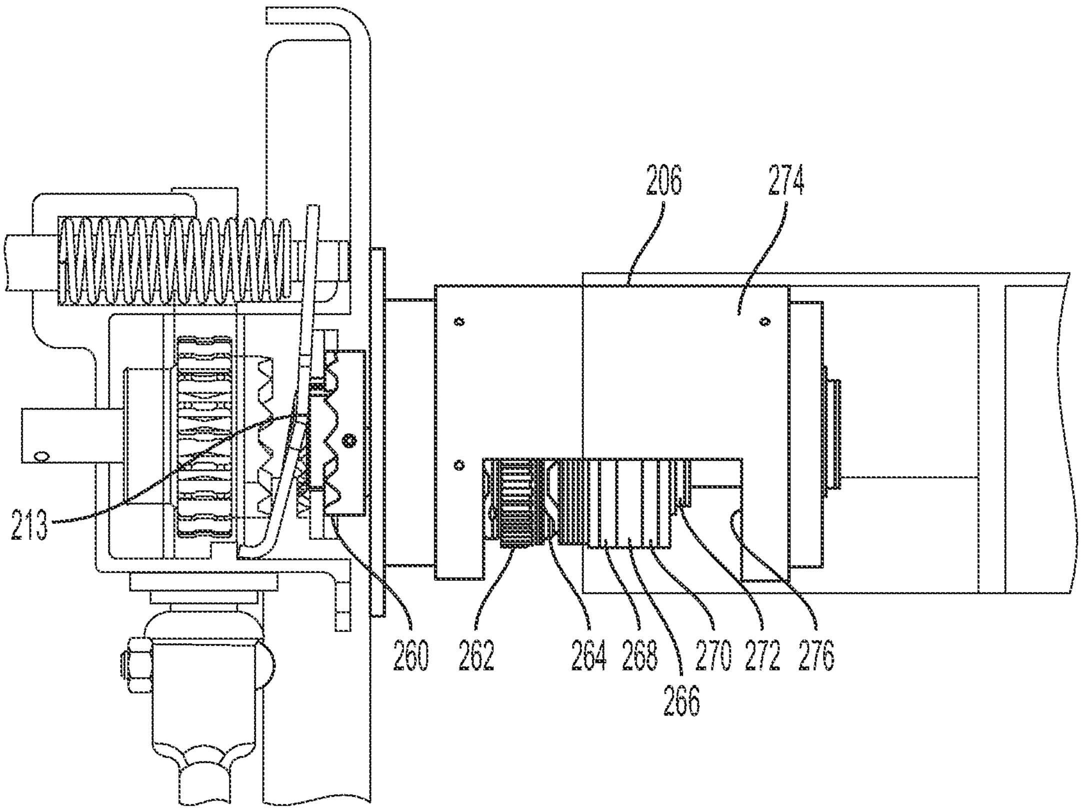
FIG. 6 is a side view of the adjustable speed governor of the present disclosure.
Figure 7:
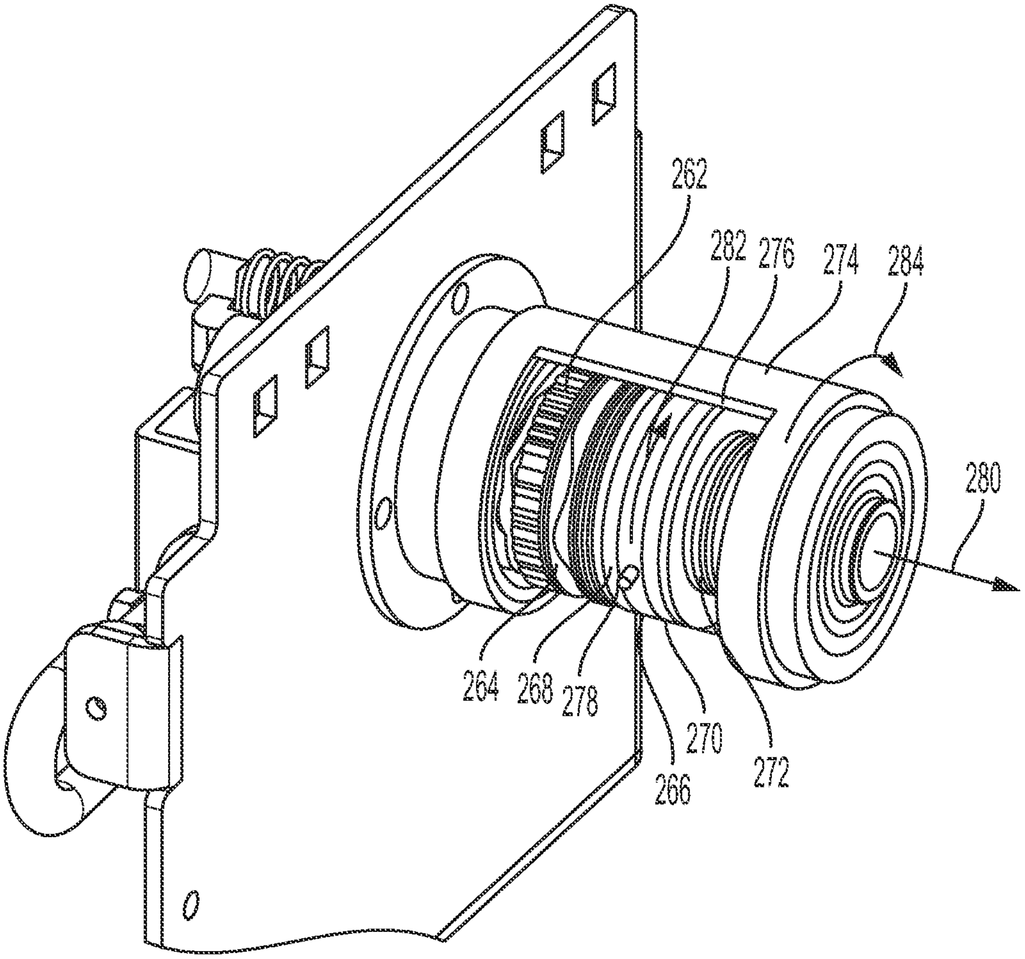
FIG. 7 is an isometric view of the adjustable speed governor and how a stopper sleeve and a pin operate in accordance with the present disclosure.

FIGS. 6 and 7 illustrate a more detailed view of the adjustable speed governor 206 of the present disclosure. As noted above, the adjustable speed governor 206 allows a user to set a closing or falling speed of the fire shutter 102 during a fire event or an alarm event with no loss of door spring tension. In contrast, previous fire shutter doors provided only a single closing speed that is restricted by the reduction gears or the type of governor that is used. The closing speed of the previous fire shutter doors could not be adjusted in the field easily and could cause the door to lose spring tension.

In one embodiment, the adjustable speed governor 206 may include a center shaft 213 that is coupled to the fire shutter 102 via the barrel 110. The receiving gear 260 may be coupled to an end of the shaft 213. The receiving gear 260 may receive the clutch 250 during a fire event, as illustrated in FIG. 5, and discussed above.

The adjustable speed governor 206 may also include a linear speed adjusting mechanism coupled to the shaft 213 and the receiving gear 260 to control a speed of the fire shutter 102 descent during a fire event. Any type of linear speed adjusting mechanism may be used. However, FIGS. 5 and 6 illustrate one example arrangement of a linear speed adjusting mechanism of the present disclosure.

In one embodiment, the linear speed adjusting mechanism may include an adjustable nut 262, a spring 264, friction pads 268 and 270, a rotatable pin plate 266, and a threaded friction sleeve 272. In one embodiment, the assembly of the friction pads 268 and 270 and the rotatable pin plate 266 may be referred to collectively as a friction pad assembly. The adjustable nut 262, the spring 264, the friction pads 268 and 270, the rotatable pin plate 266, and the threaded friction sleeve 272 may be partially enclosed by a stopper sleeve 274.

In one embodiment, the spring 264 may be located adjacent to the adjustable nut 262. The friction pad 268 may be located adjacent to the spring 264 and the rotatable pin plate 266. The rotatable pin plate 266 may be located between the friction pads 268 and 270. The threaded friction sleeve 272 may be located adjacent to the friction pad 270. The threaded friction sleeve 272 may be coupled to the friction pad assembly (e.g., the friction pads 268 and 270 and the rotatable pin plate 266). Although two friction pads 268 and 270 are illustrated in FIG. 6, it should be noted that a single friction pad or more than two friction pads may be deployed.

In one embodiment, the adjustable nut 262 may be a threaded nut that can be rotated around the shaft 213 in a clockwise or counterclockwise direction to adjust an amount of tension on the spring 264. Turning the adjustable nut 262 closer towards the spring 264 may add more tension. Adding more tension may increase the friction of the friction pads 268 and 270 against the stopper sleeve 274. Increasing the friction may cause the fire shutter 102 to close more slowly at a controlled rate, such as a rate that meets NFPA 80 standards (no slower than 6 inches per second and not faster than 24 inches per second).

Turning the adjustable nut 262 away from the spring 264 may reduce an amount of tension on the spring 264. Reducing the amount of tension may decrease the friction of the friction pads 268 and 270 against the stopper sleeve 274. Decreasing the friction may cause the fire shutter 102 to close more quickly at a controlled rate, such as a rate that meets NFPA 80 standards (no slower than 6 inches per second and not faster than 24 inches per second).

In one embodiment, the adjustable nut 262 may be marked with demarcations to indicate a speed associated with a rotated position. Thus, a user may easily set the adjustable nut 262 to a position associated with a desired speed. The demarcations may be numerical (e.g., 1 through 10), may be words (e.g., slow, medium, and fast), or may be actual speed values.

In one embodiment, the rotatable pin plate 266 may include a pin 278, as shown in FIG. 7. The pin 278 may have a cylindrical shape. The pin 278 may protrude away from an outer surface of the rotatable pin plate 266. For example, the pin 278 may protrude away from the shaft 213 towards an outer edge of the stopper sleeve 274.

In one embodiment, the stopper sleeve 274 may have a cylindrical shape and include a cut-out 276. As noted above, the stopper sleeve 274 may partially enclose the adjustable nut 262, the spring 264, the friction pads 268 and 270, the rotatable pin plate 266, and the threaded friction sleeve 272. Said another way, the diameter of the stopper sleeve 274 may be larger than the diameter of the adjustable nut 262, the spring 264, the friction pads 268 and 270, the rotatable pin plate 266, and the threaded friction sleeve 272.

In one embodiment, the cut-out 276 may remove a portion of the outer shell or surface area of the stopper sleeve 274. The stopper sleeve 274 may be rotatable around the shaft 213 along an axis 280, as shown by an arrow 284. The stopper sleeve 274 may be rotated to position the cut-out 276 at a desired location relative to the pin 278 on the rotatable pin plate 266. The position of the cut-out 276 relative to the pin 278 may determine when the linear braking applied by the friction pads 268 and 270 may be engaged when the fire shutter 102 is closing in the event of a fire.

For example, the rotatable pin plate 266 may be keyed to the threaded friction sleeve 272. When a fire occurs, the sash chain 240 may release the tension on the actuator spring 242, which causes the lever 244 to move the clutch 250 from the receiving gear 220 of the drive assembly 202 to the receiving gear 260 of the adjustable speed governor 206. The fire shutter 102 may begin to close, causing the barrel 110 and the center shaft 213 to rotate. Rotation of the center shaft 213 may rotate the threaded friction sleeve 272, which may in turn rotate the rotatable pin plate 266.

When the pin 278 is rotated by the rotatable pin plate 266, as shown by an arrow 282, the pin 278 may eventually contact an edge of the cut-out 276 of the stopper sleeve 274. This may prevent the rotatable pin plate 266 from rotating and engage the linear braking applied by the friction pads 268 and 270. The center shaft 213 may transmit the counter-acting torque created by the linear braking to the clutch 250. The counter-acting torque may be braking/governing the drop or descending speed/rate of the fire shutter 102. The overall speed at which the fire shutter 102 descends may be a function of a position of the adjustable nut 262, as described above.

Thus, the design of the adjustable speed governor 206 allows a user to adjust a speed at which the fire shutter 102 may close during a fire or alarm event. In addition, the drive assembly 202 and the adjustable speed governor 206 are located on a same side of the fire shutter 102. The drive assembly 202 and the adjustable speed governor 206 are positioned in-line on the center shaft 213. In addition, the operator governor release 112 may be moved to the front of the door with a sprocket to further reduce side room. This allows the operator governor release 112 of the present disclosure to have a smaller footprint or smaller dimensions.

As noted above, the operator governor release 112 of the present disclosure may reduce an overall width of the head assembly 106 by 5 to 10 inches.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:

a drive assembly coupled to a center shaft, wherein the drive assembly is operated to rotate a barrel to open and close a fire shutter coupled to the barrel via rotation of the center shaft;

an adjustable speed operator governor release coupled to the center shaft and located in-line with the drive assembly, wherein the adjustable speed operator governor release comprises:

an adjustable nut;

a spring located adjacent to the adjustable nut;

a first friction pad located adjacent to the spring;

a rotatable pin plate having a protruding pin coupled to a surface of the rotatable pin plate located adjacent to the first friction pad;

a second friction pad located adjacent to the rotatable pin plate;

a threaded friction sleeve coupled to the first friction pad, the rotatable pin plate, and the second friction pad, wherein the adjustable nut, the spring, the first friction pad, the rotatable pin plate, the second friction pad, and the threaded friction sleeve are located in-line on the center shaft; and a stopper sleeve to partially enclose the adjustable nut, the spring, the first friction pad, the rotatable pin plate, the second friction pad, and the threaded friction sleeve, wherein the stopper sleeve comprises a cut-out and the stopper sleeve is rotatable around the center shaft to position the cut-out at a desired location relative to the protruding pin of the rotatable pin plate; and a spring-loaded clutch assembly that is located between the drive assembly and the adjustable speed operator governor release to transfer control between the drive assembly and the adjustable speed operator governor release.

2. The apparatus of claim 1, wherein the drive assembly comprises a back drive feature.

3. The apparatus of claim 1, wherein the spring-loaded clutch assembly comprises:

a clutch located on the center shaft in-line and between the drive assembly and the adjustable speed operator governor release;

a lever located against the clutch;

a sash chain coupled to an end of the lever;

an actuator spring coupled to the sash chain; and a clutch spring coupled to the clutch on an opposite side from the lever.

4. The apparatus of claim 3, wherein the actuator spring is compressed and the clutch spring is expanded to engage the clutch against the drive assembly during normal operation.

5. The apparatus of claim 3, wherein the sash chain is released during a fire to allow the actuator spring to expand.

6. The apparatus of claim 5, wherein the actuator spring is expanded to move the lever towards the adjustable speed operator governor release and compress the clutch spring to engage the clutch against the adjustable speed operator governor release.

7. The apparatus of claim 3, wherein the lever comprises:

a first member coupled to the sash chain; and a second member coupled to the first member at an angle, wherein the second member rests against a surface of the clutch.

8. The apparatus of claim 3, wherein a spring load of the actuator spring is greater than a spring load of the clutch spring.

9. The apparatus of claim 1, wherein the adjustable nut is rotatable to adjust an amount of tension applied against the spring such that the spring applies a tension against the first friction pad and the second friction pad, the adjustment to the amount of tension to control an amount of braking applied by the first friction pad and the second friction pad to adjust a speed of descent of the fire shutter during a fire.

10. A fire shutter assembly, comprising:

a barrel;

a fire shutter coupled to the barrel, wherein the fire shutter is to be rolled around the barrel in an open position or rolled off of the barrel in a closed position;

a drive assembly coupled to the barrel via a center shaft to manually operate the fire shutter;

an adjustable speed operator governor release coupled to the center shaft and located in-line with the drive assembly, wherein the adjustable speed operator governor release comprises:

an adjustable nut;

a spring located adjacent to the adjustable nut;

a first friction pad located adjacent to the spring;

a rotatable pin plate having a protruding pin coupled to a surface of the rotatable pin plate located adjacent to the first friction pad;

a second friction pad located adjacent to the rotatable pin plate;

a threaded friction sleeve coupled to the first friction pad, the rotatable pin plate, and the second friction pad, wherein the adjustable nut, the spring, the first friction pad, the rotatable pin plate, the second friction pad, and the threaded friction sleeve are located in-line on the center shaft; and a stopper sleeve to partially enclose the adjustable nut, the spring, the first friction pad, the rotatable pin plate, the second friction pad, and the threaded friction sleeve, wherein the stopper sleeve comprises a cut-out and the stopper sleeve is rotatable around the center shaft to position the cut-out at a desired location relative to the protruding pin of the rotatable pin plate;

a spring-loaded clutch assembly that is located between the drive assembly and the adjustable speed operator governor release; and a sash chain coupled to the spring-loaded clutch assembly, wherein during a fire, the sash chain is released to move the spring-loaded clutch assembly from the drive assembly to the adjustable speed operator governor release to control a speed that the fire shutter is closed.

11. The fire shutter assembly of claim 10, wherein the spring-loaded clutch assembly comprises:

a clutch located on the center shaft in-line and between the drive assembly and the adjustable speed operator governor release;

a lever located against the clutch and coupled to the sash chain;

an actuator spring coupled to the sash chain; and a clutch spring coupled to the clutch on an opposite side from the lever.

12. The fire shutter assembly of claim 11, wherein the actuator spring is expanded when the sash chain is released to move the lever towards the adjustable speed operator governor release and compress the clutch spring to engage the clutch against the adjustable speed operator governor release.

13. An apparatus, comprising:

a drive assembly coupled to a center shaft, wherein the drive assembly is operated to rotate a barrel to open and close a fire shutter coupled to the barrel via rotation of the center shaft;

an adjustable speed operator governor release coupled to the center shaft and located in-line with the drive assembly, wherein the adjustable speed operator governor release is set by rotating a portion of the adjustable speed operator governor release around the center shaft to a position that determines when braking is applied to control a closing speed of the fire shutter; and a spring-loaded clutch assembly that is located between the drive assembly and the adjustable speed operator governor release to transfer control between the drive assembly and the adjustable speed operator governor release, wherein the spring-loaded clutch assembly comprises:

a clutch located on the center shaft in-line and between the drive assembly and the adjustable speed operator governor release;

a lever located against the clutch, wherein the lever comprises a first member coupled to a second member;

an actuator spring coupled to an end of the first member of the lever; and a clutch spring coupled to the clutch on an opposite side from the lever, wherein the actuator spring controls movement of the lever to cause the lever to control a lateral movement of the clutch along the center shaft.

14. The apparatus of claim 13, wherein the spring-loaded clutch assembly, further comprises:

a sash chain coupled to the end of the first member of the lever, wherein the actuator spring is coupled to the end of the first member of the lever via the sash chain.

15. The apparatus of claim 13, wherein when the actuator spring is in a contracted state, the lever moves the clutch laterally along the center shaft towards a receiving gear of the drive assembly to allow manual operation of the drive assembly.

16. The apparatus of claim 13, wherein when the actuator spring is in an expanded state, the lever moves the clutch laterally along the center shaft towards a receiving gear of the adjustable speed operator governor release.

17. The apparatus of claim 16, wherein a spring load of the actuator spring is greater than a spring load of the clutch spring, such that the spring load of the actuator spring overcomes the spring load of the clutch spring when the actuator spring is in the expended state to allow the clutch to compress the clutch spring as the clutch is moved laterally along the center shaft towards the receiving gear of the adjustable speed operator governor release.

18. The apparatus of claim 13, wherein the first member is coupled to the second member at an angle.

19. The apparatus of claim 18, wherein the second member lays against a surface of the clutch that faces the drive assembly.

20. The apparatus of claim 13, wherein the position is one of a plurality of positions around the center shaft, wherein each one of the plurality of positions around the center shaft is associated with a different speed.

* * * * *